(12) United States Patent
Monvoisin et al.

(10) Patent No.: US 10,232,952 B2
(45) Date of Patent: Mar. 19, 2019

(54) METHOD FOR THREE-DIMENSIONAL GRAPHIC REPRESENTATION OF A LANDING RUNWAY ON AN AIRCRAFT DISPLAY DEVICE

(71) Applicant: THALES, Courbevoie (FR)

(72) Inventors: Emmanuel Monvoisin, Bordeaux (FR); Pierre Mariani, Saint Medard en Jalles (FR); Pierre-Yves Dumas, Guilherand-Granges (FR); Johanna Lux, Le Haillan (FR)

(73) Assignee: Thales, Courbevoie (FR)

( * ) Notice: Subject to any disclaimer, the term of this patent is extended or adjusted under 35 U.S.C. 154(b) by 6 days.

(21) Appl. No.: 15/394,774

(22) Filed: Dec. 29, 2016

(65) Prior Publication Data

US 2017/0183102 A1    Jun. 29, 2017

(30) Foreign Application Priority Data

Dec. 29, 2015    (FR) ...................... 15 02718

(51) Int. Cl.
*B64D 43/00* (2006.01)
*B64D 45/08* (2006.01)
(Continued)

(52) U.S. Cl.
CPC ............. *B64D 43/00* (2013.01); *B64D 45/08* (2013.01); *G01C 23/00* (2013.01); *G06T 15/00* (2013.01);
(Continued)

(58) Field of Classification Search
CPC ...... G08G 5/0021; G08G 5/025; B64D 43/00; B64D 45/08; G06T 15/50; G06T 19/006;
(Continued)

(56) References Cited

U.S. PATENT DOCUMENTS 8,099,202 B1 * 1/2012 Krenz .................... G08G 5/025
701/14
8,589,071 B2    11/2013 Feyereisen et al.
(Continued)

FOREIGN PATENT DOCUMENTS

EP    2 511 733 A2    10/2012
FR    30333903    *    9/2016    ............. G02B 27/01

OTHER PUBLICATIONS

French Search Report for corresponding French Patent Application No. 1502718, 7 pp., (dated Nov. 2, 2016).

*Primary Examiner* — Mark K Zimmerman
*Assistant Examiner* — Phuc N Doan
(74) *Attorney, Agent, or Firm* — Womble Bond Dickinson (US) LLP

(57) ABSTRACT

The general field of the invention is that of the methods for three-dimensional graphic representation of at least one landing runway on a display device of an onboard display system for aircraft, said graphic representation being displayed in a synthetic of an outside landscape, said runway comprising a coloured rectangular form, an outline surrounding said form and markings the position of the aircraft in relation to said runway being known in a horizontal plane with a first accuracy and in a vertical axis with a second accuracy. When the first accuracy is above a first threshold and/or when the second accuracy is above a second threshold, the appearance of the rectangular form or of the outline or of at least one marking is modified.

12 Claims, 4 Drawing Sheets

(51) Int. Cl.
*G06T 19/00* (2011.01)
*G01C 23/00* (2006.01)
*G08G 5/00* (2006.01)
*G08G 5/02* (2006.01)
*G06T 19/20* (2011.01)
*G06T 15/50* (2011.01)
*G06T 15/00* (2011.01)

(52) U.S. Cl.
CPC ............ *G06T 15/50* (2013.01); *G06T 19/006* (2013.01); *G06T 19/20* (2013.01); *G08G 5/0021* (2013.01); *G08G 5/025* (2013.01); *G06T 2200/04* (2013.01); *G06T 2219/2016* (2013.01)

(58) Field of Classification Search
CPC ................ G06T 19/20; G06T 2200/04; G06T 2219/2016; G06T 15/00; G06T 15/20; G01C 23/00
See application file for complete search history.

(56) References Cited

U.S. PATENT DOCUMENTS

| | | | |
|---|---|---|---|
| 8,630,756 B2* | 1/2014 | Fleiger-Holmes | G01S 1/18 342/33 |
| 9,384,586 B1* | 7/2016 | McCusker | G08G 5/0021 |
| 2009/0135092 A1* | 5/2009 | Uematsu | G02B 27/0101 345/7 |
| 2010/0201692 A1* | 8/2010 | Niles | G06T 13/20 345/473 |
| 2010/0250030 A1* | 9/2010 | Nichols | G01C 23/005 701/7 |
| 2011/0304479 A1* | 12/2011 | Chen | G08G 5/0021 340/951 |
| 2012/0026190 A1* | 2/2012 | He | G01C 21/00 345/633 |
| 2012/0050524 A1* | 3/2012 | Rinner | G06T 3/40 348/117 |
| 2013/0300587 A1* | 11/2013 | Wyatt | G01C 23/00 340/972 |
| 2014/0009585 A1* | 1/2014 | Campbell | H04N 13/0203 348/47 |
| 2014/0100720 A1* | 4/2014 | Fleiger-Holmes | G01S 1/18 701/4 |
| 2014/0354456 A1* | 12/2014 | Gannon | G08G 5/0047 340/972 |
| 2015/0081143 A1* | 3/2015 | Snow | G08G 5/0021 701/16 |
| 2018/0148072 A1* | 5/2018 | Kamiya | G06K 9/0061 |

\* cited by examiner

METHOD FOR THREE-DIMENSIONAL GRAPHIC REPRESENTATION OF A LANDING RUNWAY ON AN AIRCRAFT DISPLAY DEVICE

FIELD

The field of the invention is that of the human-system interfaces for aeronautical applications, and more particularly that of the synthetic display systems comprising means for displaying a three-dimensional synthetic image of the outside landscape.

BACKGROUND

Modern aircraft generally have a Synthetic Vision System called "SVS". This system makes it possible to show the crew a synthetic image of the outside landscape generally including piloting or navigation information.

An SVS system comprises a mapping database representative of the terrain flown over, a geolocation system, electronic computation means and one or more display devices installed in the cockpit of the aircraft. The geolocation system is of the "GPS" (Global Positioning System) type. It can be coupled with the inertial system of the aircraft. The geolocation system as a whole supplies at least the following parameters: position of the aircraft in latitude, longitude and altitude and orientation of the aircraft in pitch, roll and heading.

Generally, the image is displayed on the display screens which are located on the front of the aircraft instrument panel. The image is a three-dimensional view of the outside represented as realistically as possible. The viewpoint displayed is in the axis of the aircraft.

This type of system, very attractive for the user, presents a view such that this user may be over-reassured as to the position of the elements around him or her and, in particular, the landing runways. However, depending on the quality of the positioning system, the image is not exact or may be only partially exact. The current systems start from the assumption that the quality of the positioning is sufficient to guarantee the quality of the information presented. However, this assumption may be false in certain cases, particularly when the aircraft is very close to the ground.

The types of errors that can be encountered are horizontal and vertical positioning errors which can result in setting down outside of the runway, which is unacceptable.

One means for resolving this problem is to present to the user the areas of the image which are credible and the areas which are not, given the accuracy provided by the geolocation system. The "non-credible" area is then indicated by an opaque or semi-transparent colouring or else by a deliberately blurred area. The drawback of this solution is that it can mask a large part of the synthetic terrain, whereas, in a landing runway approach phase, the terrain is generally flat around the runway. It is not therefore necessary to mask it since a horizontal and vertical positioning error is reflected by a translation or rotation of the terrain, therefore this error will be indistinct on the terrain around the runway.

Another solution is described in the U.S. Pat. No. 8,589,071 entitled "Aircraft Vision System including a runway position indicator". It is illustrated in FIG. 1. The display comprises a specific symbol S around the assumed position of the runway P. As can be seen in FIG. 1, this symbol is larger than the real runway in order to assist the pilot in visually acquiring the landing runway by giving him or her an indication concerning the area to watch. The drawback of this solution is that it adds symbols to the graphic representation and therefore increases the workload of the pilot for interpreting all of the information displayed.

SUMMARY

The landing assistance representation method in a three-dimensional synthetic view according to the invention does not present these drawbacks. It uses the existing symbols but changes their graphic representations as a function of the positioning errors. More specifically, the subject of the invention is a method for three-dimensional graphic representation of at least one landing runway on a display device of an onboard display system for aircraft, said graphic representation being displayed in a synthetic view of an outside landscape, said runway comprising a coloured rectangular form, an outline surrounding said form and markings, the position of the aircraft in relation to said runway being known in a horizontal plane with a first accuracy and in a vertical axis with a second accuracy, characterized in that, when the first accuracy is above a first threshold and/or when the second accuracy is above a second threshold, the appearance of the rectangular form or of the outline or of at least one marking is modified.

Advantageously, the appearance modification is an enlargement of the rectangular form, this enlargement consisting in blurring the perimeter of the rectangular form over a width that is a function of the first and/or of the second accuracy.

Advantageously, the blurring is a continuous transparency gradient, the transparency increasing with the distance to the centre of the runway, the transparency law being able to be, without being limited thereto, a Gaussian or linear or radial function.

Advantageously, the blurring is obtained by a set of interleaved rectangles, each rectangle having a transparency value increasing with the distance to the centre of the runway.

Advantageously, the appearance modification consists of a progressive transparency of the rectangular form, the transparency being an increasing function of the first and/or of the second accuracy, the rectangular form being totally opaque when the first accuracy is below the first threshold and/or when the second accuracy is below the second threshold and totally transparent when the first accuracy is above a third threshold and/or when the second accuracy is above a fourth threshold.

Advantageously, the appearance modification consists in changing the outline to dotted lines and enlarging it, the enlargement being an increasing function of the first and/or of the second accuracy.

Advantageously, the appearance modification consists in deleting the outline.

Advantageously, the appearance modification consists of a progressive transparency of the markings, the transparency being an increasing function of the first and/or of the second accuracy, the markings being totally opaque when the first accuracy is below the first threshold and/or when the second accuracy is below the second threshold and totally transparent when the first accuracy is above a fifth threshold and/or when the second accuracy is above a sixth threshold.

Advantageously, when the display comprises several runways belonging to one and the same airport, all or part of the graphic representation of the runways simultaneously undergoes the same appearance modifications.

Advantageously, the appearance modifications are made progressively.

Advantageously, the method comprises at least two different appearance modifications, the first appearance modification depending on the first accuracy threshold and on the second accuracy threshold, the second appearance modification depending on a seventh accuracy threshold and on an eighth accuracy threshold, the second appearance modification succeeding or being added to the first modification.

Advantageously, the appearance modifications are effective only when the aircraft is below a predetermined distance to the runway.

Advantageously, the display device comprises a real image of the outside landscape superimposed on the synthetic view of the outside landscape.

Advantageously, the display device is one of the aircraft instrument panel screens.

Advantageously, the display device is a so-called "head up" display device comprising an optical element superimposing the synthetic image and/or the real image on the outside landscape.

BRIEF DESCRIPTION OF THE DRAWINGS

The invention will be better understood and other advantages will become apparent on reading the following description given in a nonlimiting manner and from the attached figures in which.

DETAILED DESCRIPTION

The method according to the invention is implemented in a synthetic display system or SVS embedded on aircraft. The latter comprises at least one mapping database, geolocation means, electronic means making it possible to compute a representation of the main parameters of the aircraft, a graphic computer and at least one display device. The geolocation means are, by way of example, of "GPS" (Global Positioning System) type coupled/hybridized or not with inertial units.

Figure 1:
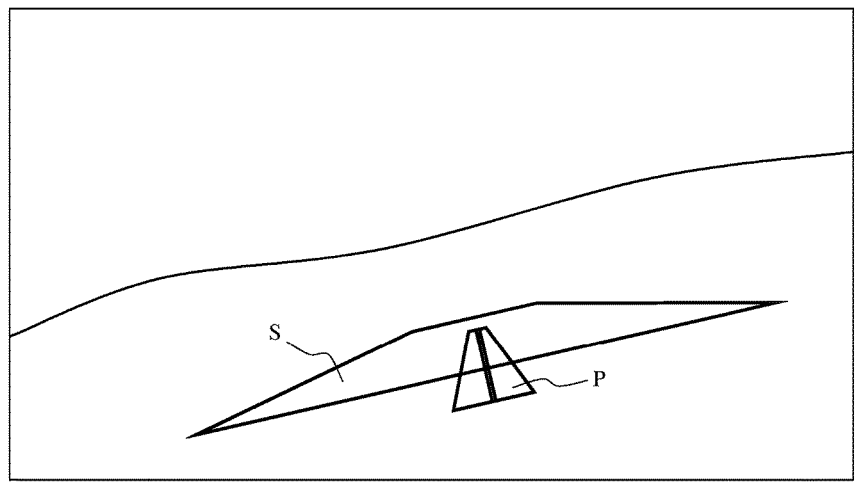
FIG. 1 represents a three-dimensional graphic view of a landing runway on an aircraft display device according to the prior art.
Figure 2:
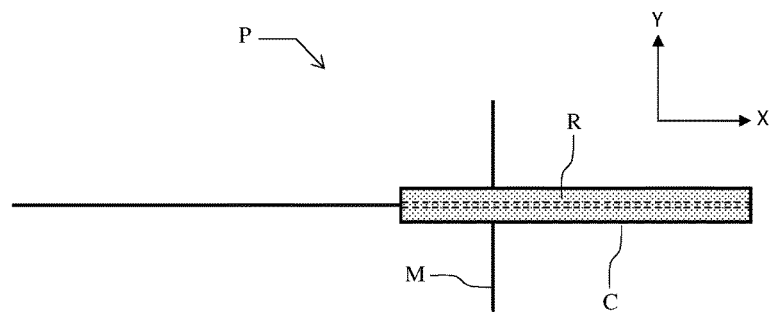
FIG. 2 represents the synthetic representation of a runway in plan view in nominal representation.

The display on the screen of the display device represents a three-dimensional synthetic view of the of terrain flown over. This view can comprise a synthetic representation of a landing runway. By way of example, FIG. 2 shows the synthetic representation of a runway P seen from above in nominal representation in a reference frame (X, Y). Conventionally, this runway comprises a coloured rectangular form R, an outline C surrounding said form and markings M representative of the markings that exist on the ground. The synthetic runway can be represented by a grey rectangle with white markings representing the runway number, the runway axis, the touch down area, etc.

In the method according to the invention, the position of the aircraft in relation to said runway being known in a horizontal plane with a first accuracy and in a vertical axis with a second accuracy, when the first accuracy is above a first threshold and/or when the second accuracy is above a second threshold, the appearance of the rectangular form or of the outline or at least of a marking is modified.

The positioning accuracy can, for example, be obtained from the figure of merit or "FOM" given in real time by the GPS system. There is an FOM for the horizontal position called HFOM, applicable to the latitude and the longitude of the aircraft, and an FOM for the vertical position called VFOM, applicable to the altitude of the aircraft. The combination of the HFOM and of the VFOM gives a sphere of positioning accuracy around the position of the aircraft given by the GPS. The FOM is an upper bound of the radius of this sphere. For example, if the real 95% error is 10 m, the FOM indicates 25 m. Therefore, if the maximum acceptable error is defined as 20 m, it is essential not to use the raw FOM value as the basis. There is a risk of modifying the representation of the runway without reason. Preferably, to obtain the useful accuracy, the FOM is multiplied by a given coefficient to obtain a true 95% value.

To give orders of magnitude, the horizontal threshold value, acceptable maximum of the real horizontal value of the 95% position error is equal to 20 m, which represents a horizontal error of +/−20 m.

Figure 3:
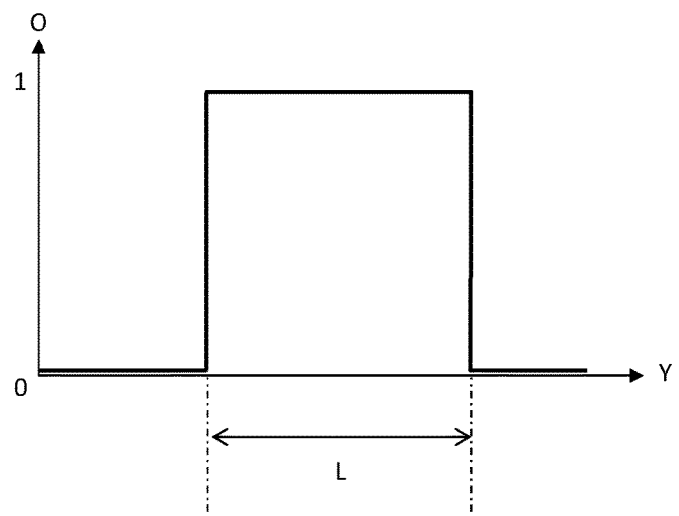
FIG. 3 represents, in a cutting axis, the degree of opacity of the runway in nominal representation.

The first appearance modification that can be made is an enlargement of the rectangular form of the runway, this enlargement consisting in blurring the perimeter of the rectangular form over a width that is a function of the first and/or of the second accuracy. By way of example, when the situation is nominal, the runway is sharp and these edges are perfectly defined. FIG. 3 then represents the variation of opacity of the runway along an axis Y at right angles to the runway axis. The runway is perfectly opaque over a width L, equal to that of the runway axis and transparent outside.

Figure 4:
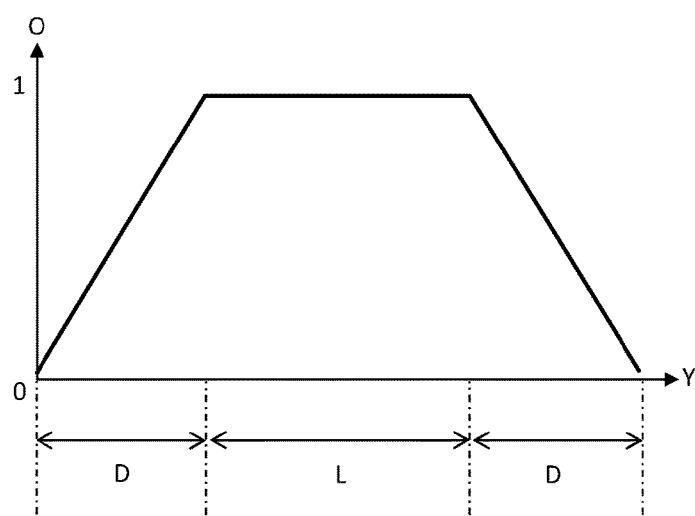
FIG. 4 represents, in a cutting axis, the degree of opacity of the runway in a first representation mode according to the invention.
Figure 5:
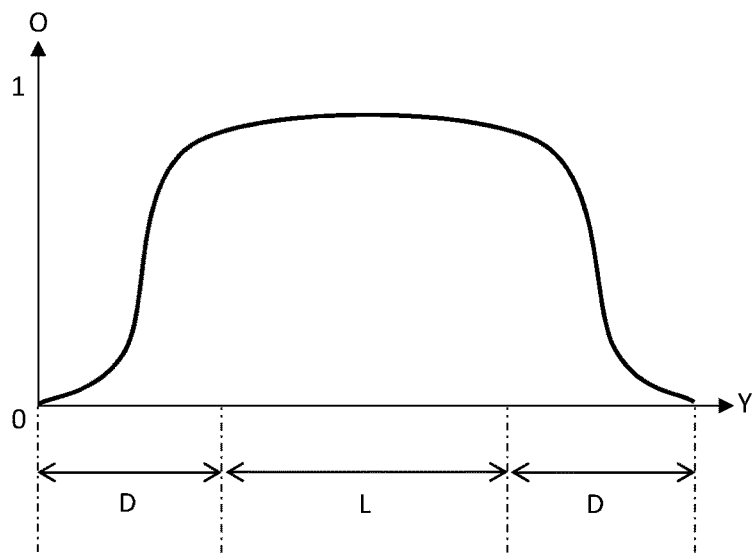
FIG. 5 represents, in a cutting axis, the degree of opacity of the runway in a second representation mode according to the invention.

When the runway becomes blurred, these edges are enlarged. The opacity then varies continually over a certain width D. A first example is represented in FIGS. 4 and 5 which show the variation of opacity of the runway along an axis Y at right angles to the runway axis. In these two figures, the blurring is a continuous transparency gradient, the transparency increasing with the distance to the centre of the runway, the transparency law being a linear function as represented in FIG. 4 or Gaussian function as represented in FIG. 5 or even a radial function. As a second example, the blurring is represented by a set of interleaved rectangles, each rectangle having a transparency value that increases with distance away from the runway. The degree of opacity of the runway, in a cutting axis, is in staircase tread form.

Figure 6:
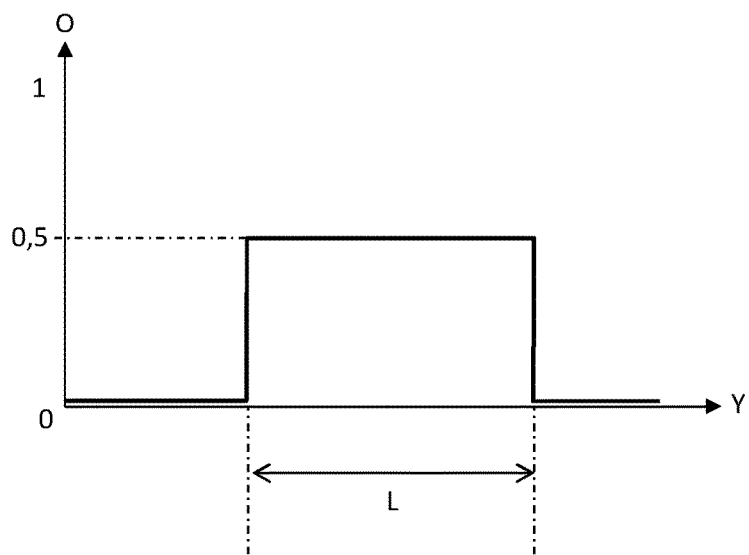
FIG. 6 represents, in a cutting axis, the degree of opacity of the runway in a third representation mode according to the invention.

The second appearance modification is a progressive transparency of the runway. The transparency is an increasing function of the first and/or of the second accuracy, the rectangular form being totally opaque when the first accuracy is below a first threshold and/or when the second accuracy is below a second threshold and totally transparent when the first accuracy is above a third threshold and/or when the second accuracy is above a fourth threshold. This second modification is illustrated by FIG. 6 which shows the variation of opacity of the runway along an axis Y at right angles to the runway axis. In the case of FIG. 6, the opacity along the runway is no more than 50%.

Figure 7:
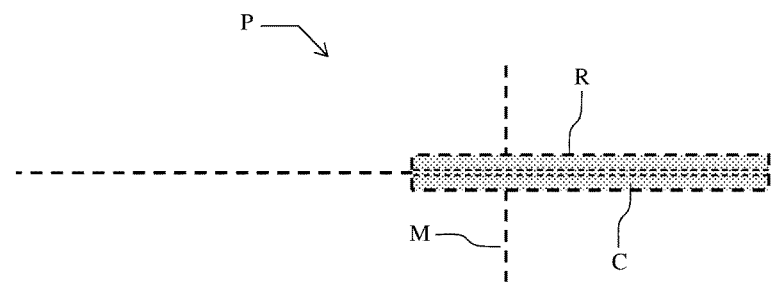
FIG. 7 represents the synthetic representation of a runway seen from above in a fourth representation mode according to the invention.

The third appearance modification consists in changing the outline to dotted lines and enlarging it, the enlargement of the rectangular form of the outline being an increasing function of the first and/or of the second accuracy. This modification is illustrated in FIG. 7 which shows the synthetic representation of a runway seen from above with its outline in dotted lines. The dotted lines can be spaced apart until the outline totally disappears. In a first variant embodiment, the dotted lines can be replaced by a blinking with a higher or lower blinking frequency and a greater or lesser time of appearance of the outline of the runway. In a second variant, the outline can fade away, becoming increasingly transparent until it totally disappears. In a third variant, the representation of the outline of the runway can be a mix of the above variants.

The fourth appearance modification consists of a progressive transparency of the different markings, the transparency being an increasing function of the first and/or of the second accuracy, the markings being totally opaque when the first accuracy is below a first threshold and/or when the second accuracy is below a second threshold, and totally transparent when the first accuracy is above a fifth threshold and/or when the second accuracy is above a sixth threshold. This fifth threshold and this sixth threshold can be identical to or different from the third and fourth thresholds. In a variant embodiment, the transparency can be replaced by a blinking with a higher or lower blinking frequency and a greater or lesser time of appearance of the markings.

When the landing takes place on an airport comprising several runways, all or part of the graphic representation of the runways can simultaneously undergo the same appearance modifications as described above. Alternatively, it is possible to modify the display only of the landing runway which is actually used by the aircraft.

Generally, the appearance modifications are made progressively so as to avoid any untimely change in the graphic representation. The method comprises a hysteresis function making it possible to resolve this problem.

Figure 8:
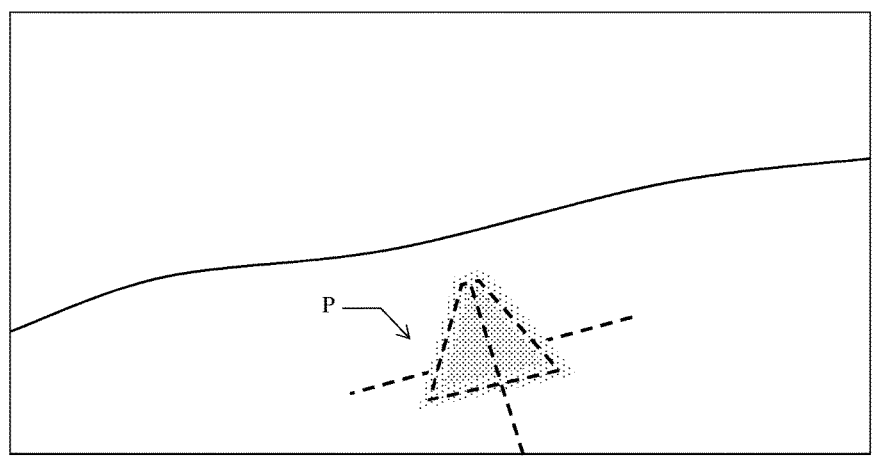
FIG. 8 represents a three-dimensional graphic view of a landing runway on an aircraft display device according to the invention.

Several appearance modifications as described above can be implemented either simultaneously, or in succession in time with accuracy thresholds which can be identical or different. By way of nonlimiting examples, it is possible, as illustrated in FIG. 8 which represents a three-dimensional synthetic view of a runway displayed by the method according to the invention, to make the following modifications. In this view, the perimeter of the runway is blurred, its outline is represented in dotted lines as are the different runway markers. As a second example, it is possible, initially, to make the runway blurred while retaining its solid line outline, then, if the errors are greater, to replace the solid line outline with a dotted line outline. The different possible combinations of modifications all fall within the scope of the method according to the invention.

Preferentially, the appearance modifications are effective only when the aircraft is below a determined distance to the runway. This display change threshold linked to the distance is meaningful because a runway positioning error that is counted in meters is indistinct at a great distance, but becomes highly visible at a short distance. At a given distance, when the difference in display of an element compared to the reality becomes too great, a choice is then made to change the display thereof or even to eliminate the display thereof. Thus, pointlessly computing changing of low legibility is avoided.

The display of the image of the synthetic runway can be performed in different ways. The display device can comprise a real image of the outside landscape superimposed on the synthetic view of the outside landscape. This system is known as "Combined Vision System". The display device can be one of the aircraft instrument panel screens. The display device can also be a so-called "head up" display device comprising an optical element superimposing the synthetic image of the runway thus modified on the outside landscape. Here again, it can comprise a real image of the outside landscape.

What is claimed is:

1. A method for three-dimensional graphic representation of at least one landing runway on a display device of an onboard display system for aircraft, said graphic representation being displayed in a synthetic view of an outside landscape, said runway comprising a coloured rectangular form, an outline surrounding said form and markings, the position of the aircraft in relation to said runway being known in a horizontal plane with a first accuracy and in a vertical axis with a second accuracy, wherein, when the first accuracy is above a first threshold and/or when the second accuracy is above a second threshold, the appearance of the rectangular form or of the outline or of at least one marking is modified without disappearance of both the rectangular form and the outline surrounding said form and markings.

2. The graphic representation method according to claim 1, wherein the appearance modification is an enlargement of the rectangular form, this enlargement consisting in blurring the perimeter of the rectangular form over a width that is a function of the first and/or of the second accuracy.

3. The graphic representation method according to claim 2, wherein the blurring is a continuous transparency gradient, the transparency increasing with the distance to the centre of the runway, the transparency law being a Gaussian or linear or radial function.

4. The graphic representation method according to claim 2, wherein the blurring is obtained by a set of interleaved rectangles, each rectangle having a transparency value increasing with the distance to the centre of the runway.

5. The graphic representation method according to claim 1, wherein the appearance modification consists in changing the outline to dotted lines and enlarging it, the enlargement being an increasing function of the first and/or of the second accuracy.

6. The graphic representation method according to claim 1, wherein, when the display comprises several runways belonging to one and the same airport, all or part of the graphic representation of the runways simultaneously undergoes the same appearance modifications.

7. The graphic representation method according to claim 1, wherein the appearance modifications are made progressively.

8. The graphic representation method according to claim 1, wherein the method comprises at least two different appearance modifications, the first appearance modification depending on the first accuracy threshold and on the second accuracy threshold, the second appearance modification depending on a seventh accuracy threshold and on an eighth accuracy threshold, the second appearance modification succeeding or being added to the first modification.

9. The graphic representation method according to claim 1, wherein the appearance modifications are effective only when the aircraft is below a predetermined distance to the runway.

10. The graphic representation method according to claim 1, wherein the display device comprises a real image of the outside landscape superimposed on the synthetic view of the outside landscape.

11. The graphic representation method according to claim 1, wherein the display device is one of the aircraft instrument panel screens.

12. The graphic representation method according to claim 1, wherein the display device is a so-called "head up" display device comprising an optical element superimposing the synthetic image and/or the real image on the outside landscape.

* * * * *